(12) United States Patent
Horn et al.

(10) Patent No.: US 8,924,535 B2
(45) Date of Patent: Dec. 30, 2014

(54) MAINTAINING CLOSED SUBSCRIBER GROUP INFORMATION FOR ACCESS CONTROL

(75) Inventors: Gavin B. Horn, La Jolla, CA (US); Ramachandran Subramanian, San Diego, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 562 days.

(21) Appl. No.: 12/642,548

(22) Filed: Dec. 18, 2009

(65) Prior Publication Data

US 2010/0161794 A1    Jun. 24, 2010

Related U.S. Application Data

(60) Provisional application No. 61/140,588, filed on Dec. 23, 2008, provisional application No. 61/147,415, filed on Jan. 26, 2009.

(51) Int. Cl.
*G06F 15/173* (2006.01)
*H04W 48/02* (2009.01)
*H04W 4/08* (2009.01)

(52) U.S. Cl.
CPC .............. *H04W 48/02* (2013.01); *H04W 4/08* (2013.01)
USPC ....................................... 709/224

(58) Field of Classification Search
CPC ................................. H04W 4/08; H04W 48/02
USPC ........................................................ 709/224
See application file for complete search history.

(56) References Cited

U.S. PATENT DOCUMENTS 7,177,658 B2   2/2007   Willenegger et al.
7,962,135 B2   6/2011   Cooper
(Continued)

FOREIGN PATENT DOCUMENTS

CN    1191659 A    8/1998
CN    1278982 A    1/2001
(Continued)

OTHER PUBLICATIONS

3GPP: "3GPP TS 22.011 V8.5.0 (Sep. 2008); 3rd Generation Partnership Project; Technical Specification Group Services and System Aspects; Service accessibility; (Release 8)" 3GPP TS 22.011 V8.5.0, vol. 22.011, No. V8.5.0, Sep. 1, 2008, pp. 1-26, XP002554915, Chapter 3.

(Continued)

*Primary Examiner* — Maceeh Anwari
(74) *Attorney, Agent, or Firm* — François A. Pelaez

(57) ABSTRACT

Information is maintained to assist in determining whether an access terminal is allowed to establish communication with an access point associated with a closed subscriber group (CSG). For example, CSG subscription information for visiting access terminals may be maintained at a local server. In this way, a network may use the locally stored CSG subscription information for a given access terminal to determine whether to allow that access terminal to access an access point in the network. In addition, multiple CSG lists may be maintained at an access terminal. For example, an access terminal may maintain a first list that is updateable by an operator and a second list that is updateable by a user. Here, the updating of one list may be based on a change in the other list.

19 Claims, 12 Drawing Sheets

(56) References Cited

U.S. PATENT DOCUMENTS

| | | |
|---|---|---|
| 8,005,058 B2 | 8/2011 | Pecen |
| 2007/0054668 A1* | 3/2007 | Scheinert et al. .......... 455/435.1 |
| 2008/0009268 A1 | 1/2008 | Ramer et al. |
| 2008/0076411 A1 | 3/2008 | Khetawat et al. |
| 2008/0227447 A1 | 9/2008 | Jeong et al. |
| 2008/0267153 A1* | 10/2008 | Mukherjee et al. ............ 370/338 |
| 2009/0047960 A1 | 2/2009 | Gunnarsson et al. |
| 2009/0245176 A1 | 10/2009 | Balasubramanian et al. |
| 2009/0268668 A1 | 10/2009 | Tinnakornsrisuphap et al. |
| 2010/0020745 A1 | 1/2010 | Agulnik et al. |
| 2010/0029274 A1 | 2/2010 | Deshpande et al. |
| 2010/0110987 A1 | 5/2010 | Subramanian et al. |
| 2010/0113020 A1 | 5/2010 | Subramanian et al. |
| 2010/0216469 A1 | 8/2010 | Yi et al. |
| 2012/0076018 A1 | 3/2012 | Singh et al. |

FOREIGN PATENT DOCUMENTS

| | | |
|---|---|---|
| CN | 1759628 A | 4/2006 |
| CN | 101166133 A | 4/2008 |
| JP | 9331567 A | 12/1997 |
| JP | 10174155 A | 6/1998 |
| JP | 11506278 A | 6/1999 |
| JP | 2002532989 A | 10/2002 |
| KR | 20070008537 A | 1/2007 |
| RU | 2199183 C2 | 2/2003 |
| RU | 2317646 C2 | 2/2008 |
| TW | 200840388 A | 10/2008 |
| WO | WO9638992 A1 | 12/1996 |
| WO | WO-9923836 A1 | 5/1999 |
| WO | 9941923 A1 | 8/1999 |
| WO | WO2004073338 | 8/2004 |
| WO | 2005004403 A1 | 1/2005 |
| WO | WO2008008987 | 1/2008 |
| WO | 2009115897 A1 | 9/2009 |
| WO | WO2009134625 A2 | 11/2009 |

OTHER PUBLICATIONS

International Search Report and Written Opinion—PCT/US2009/063180, International Search Authority—European Patent Office, Mar. 16, 2010.

International Search Report and Written Opinion—PCT/US2009/063181, International Search Authority—European Patent Office, Apr. 23, 2010.

International Search Report and Written Opinion—PCT/US2009/069333—International Search Authority—European Patent Office, Jun. 4, 2010.

Samsung: "P-CR: Updating Option A of Home cell deployments" 3GPP Draft; C1-073133 Updating CSG Option A, 3rd Generation Partnership Project (3GPP), Mobile Competence Centre; 650, Route Des Lucioles; F-06921 Sophia-Antipolis Cedex; France, vol. CT WG1, No. Sophia Antipolis, France; Nov. 12, 2007, XP050027286, paragraph [10.12.2.4].

"Universal Mobile Telecommunciations System (UMTS) Evolved Universal Terrestrial Radio Access (E-UTRA) and Evolved Universal Terrestrial Radio Access Network (E-UTRAN; Overall description; Stage 2 (3GPP TS 36.300 version 8.6.0 Release 8); ETSI TS 136 300" ETSI Standard, European Telecommunications Standards Institute (ETSI), Sophia Antipolis Cedex, France, vol. 3-R2, No. V8.6.0, Oct. 1, 2008, XP014042629, Paragraph 10.5.

3GPP TR 24.801: "Pseudo-CR on Allowed CSG List update," 3GPP TSG CT WG1 meeting #55; C2-083427, v 1.1.1, Budapast, Hungary, Aug. 18-22, 2008.

Taiwan Search Report—TW098144551—TIPO—Aug. 11, 2012.

Teliasonera on Behalf of H(E)NB SWG: "Correction of allowed CSGs", S1-090334, 3GPP TSG-SA1 #44, Feb. 2, 2009.

* cited by examiner

1

MAINTAINING CLOSED SUBSCRIBER GROUP INFORMATION FOR ACCESS CONTROL

CLAIM OF PRIORITY

This application claims the benefit of and priority to commonly owned U.S. Provisional Patent Application No. 61/140,588, filed Dec. 23, 2008, and U.S. Provisional Patent Application No. 61/147,415, filed Jan. 26, 2009, the disclosure of each of which is hereby incorporated by reference herein.

BACKGROUND

1. Field

This application relates generally to wireless communication and more specifically, but not exclusively, to access control.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network access points, small-coverage access points may be deployed (e.g., installed in a user's home) to provide more robust indoor wireless coverage to mobile access terminals. Such small-coverage access points may be referred to as femto access points, access point base stations, Home eNodeBs (HeNBs), Home NodeBs (HNBs), or home femtos. Typically, such small-coverage access points are connected to the Internet and the mobile operator's network via a DSL router or a cable modem. In some scenarios, some of these small-coverage access points or other access points in a network may be restricted for access in some manner. For example, different access points in the network may belong to different closed subscriber groups (CSGs).

In some situations, access issues may arise when an access terminal moves within a network that employs restricted access points or moves between networks that employ restricted access points. For example, an access terminal may need to be allowed to access some of these restricted access points but not others. Thus, there is a need for improved access management for wireless networks.

SUMMARY

A summary of sample aspects of the disclosure follows. In the discussion herein, any reference to the term aspects may refer to one or more aspects of the disclosure.

The disclosure relates in some aspects to access control for wireless communication. For example, techniques are described for maintaining information that is used to determine whether an access terminal is allowed to establish communication at an access point associated with a closed subscriber group (CSG).

The disclosure relates in some aspects to maintaining CSG subscription information for visiting access terminals at a local server. For example, when an access terminal that is subscribed at a first network requests to establish communication at an access point in a second network, the second network uses locally stored CSG subscription information for that access terminal to determine whether to allow the access terminal to establish communication at the access point.

The disclosure relates in some aspects to maintaining multiple CSG lists at an access terminal. For example, an access terminal may maintain a first list that is updateable by an operator and a second list that is updateable by a user. Here, the updating of one list may be based on a change in the other list. For example, a CSG entry may be deleted in one list if a corresponding CSG entry is deleted in the other list. Also, a CSG entry may be deleted in one list if a corresponding CSG entry is added to the other list.

BRIEF DESCRIPTION OF THE DRAWINGS

These and other sample aspects of the disclosure will be described in the detailed description and the appended claims that follow, and in the accompanying drawings, wherein:

Figure 1:
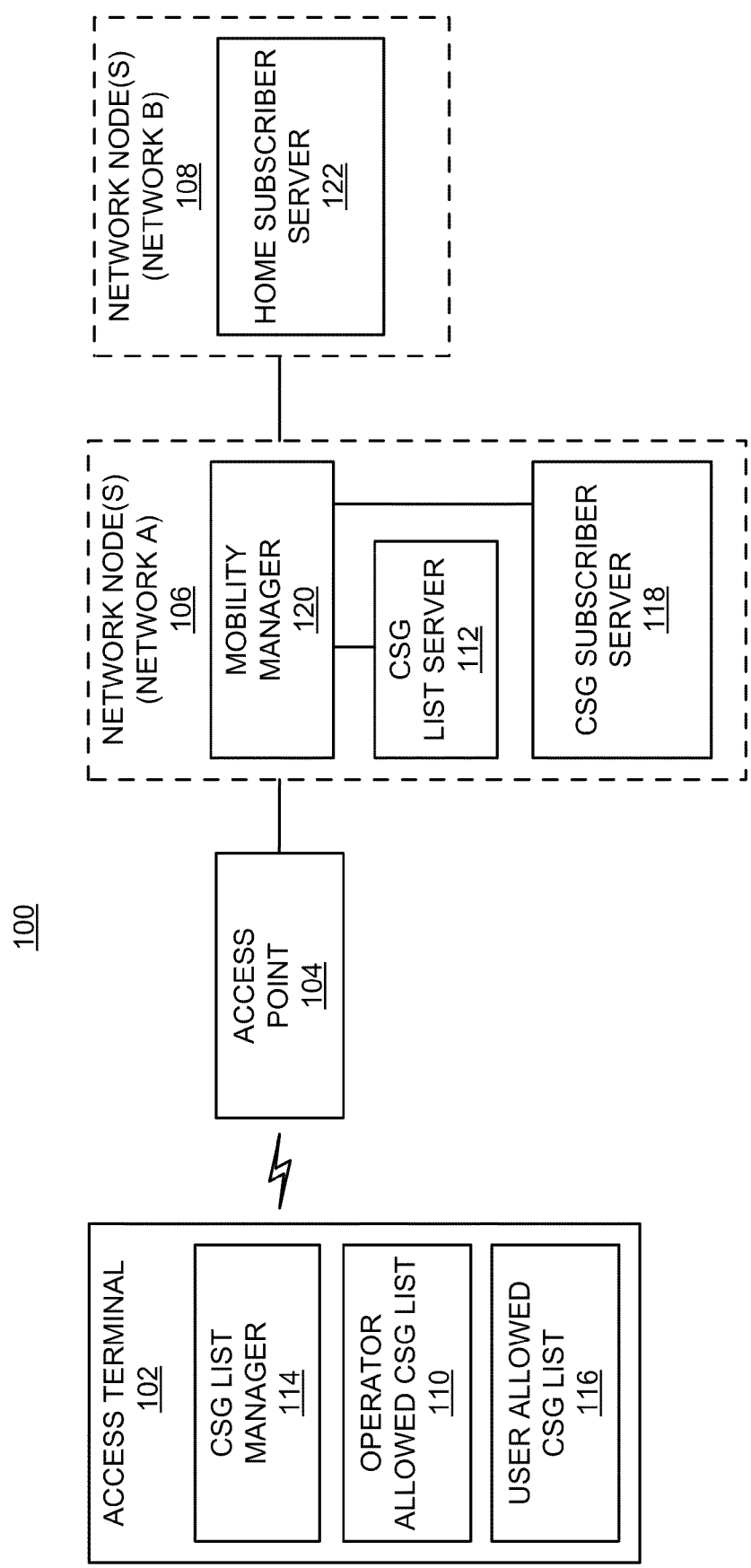
FIG. 1 is a simplified block diagram of several sample aspects of a communication system adapted to maintain CSG information for access control.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100. For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology. For example, in various implementations access points may be referred to or implemented as base stations or eNodeBs, while access terminals may be referred to or implemented as user equipment or mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104 or some other access point in the system 100 (not shown). Each of these access points may communicate with one or more network nodes (represented, for convenience, by network node (s) 106 and 108) to facilitate wide area network connectivity. These network nodes may take various forms such as, for example, one or more radio and/or core network entities. Thus, in various implementations the network nodes may represent functionality such as at least one of: network management (e.g., via an operation, administration, management, and provisioning entity), call control, session management, mobility management, gateway functions, interworking functions, or some other suitable network functionality.

In some cases, an access terminal may access a restricted access point associated with a wireless cell set. In general, a wireless cell set comprises a set of one or more cells (e.g., at least one access point) where there is a defined relationship specific to that set. An example of a wireless cell set is a closed subscriber group (CSG). For convenience, the discussion that follows may simply refer to the term CSG, rather than the more general term wireless cell set. It should be appreciated, however, that the described concepts may be applicable to other types of defined sets or groups of wireless cells or other similar entities.

As an access terminal roams throughout a network, the access terminal may use some form of list (e.g., a so-called allowed list or whitelist) to identify the access points that the access terminal is allowed to access. Conventionally, this list is maintained by the network (e.g., the network sends messages to the access terminal to update the list). However, under some conditions such a list may not have entirely accurate (e.g., current) information. In particular, when an access terminal is added to a CSG, there may be some delay before that access terminal is provisioned by the network. For example, a network may choose to only provision an access terminal once a day or the access terminal may be temporarily out of network coverage when the network adds a CSG. Also, since an access terminal may manually select an access point in some cases, the network may not always be aware of all of the access points at which the access terminal is currently allowed access.

In accordance with the teachings herein, to provide the access terminal with current information regarding all allowed access points, the access terminal may maintain more than one list. For example, one list may be updateable by the operator while another list may be updateable by the access terminal (e.g., as a result of a manual update procedure).

In the example of FIG. 1, the access terminal 102 maintains two allowed CSG lists. Each of these lists may include entries that identify any CSGs that the access terminal is allowed to access.

An operator allowed CSG list 110 is updateable by an operator. For example, as the network obtains information about which CSGs the access terminal 102 is allowed to access, a CSG list server 112 may send a message to the access terminal 102 instructing the access terminal 102 (e.g., a CSG list manager 114) to update the operator allowed CSG list 110.

A user allowed CSG list 116 is updateable by a user. For example, when the access terminal 102 performs manual cell selection or some other similar procedure, the access terminal 102 (e.g., the CSG list manager 114) may update the user allowed CSG list 116 if the access terminal is permitted access to a cell associated with a CSG identifier that is not currently present in the operator allowed CSG list 110.

The access terminal may then use both lists to determine whether it is allowed to access any CSGs it encounters while in the home network or roaming. Moreover, as discussed in more detail below in conjunction with FIGS. 4 and 5, the access terminal 102 may maintain the allowed CSG lists so that updates to one allowed CSG list automatically result in an update to the other allowed CSG list under certain circumstances. In some implementations, different lists may store different types of information. For example, the operator allowed CSG list may be used for storing CSG information for a home network (e.g., a home public land mobile network, PLMN) and the user allowed CSG list may be used for storing CSG information for one or more visited networks (e.g., visited PLMNs).

FIG. 1 illustrates, in a simplified manner, that the system 100 may comprise more than one network (e.g., different PLMNs). In the example of FIG. 1, the access point 104 and the network node(s) 106 belong to network A, while network node(s) 108 belong to network B.

In some cases, an access terminal (e.g., the access terminal 102) that is subscribed at network B may attempt to establish a connection at a CSG in network A. For example, a subscriber may wish to access service at or handover to a so-called hot-spot (e.g., at an airport, a shopping mall, a coffee house). However, the host spot may be controlled an operator that is different than the subscriber's operator. In such a case, network A needs to obtain CSG subscription information for the access terminal 102 in order to determine whether the access terminal is authorized to establish communication at this CSG. Here, the CSG subscription information identifies one or more CSGs at which the access terminal 102 is allowed access. However, network A may not be able to access a server at network B to obtain this information. For example, due to security concerns or other issues, network B may not allow network A to communicate with a server at network B that maintains network B's CSG information. Alternatively, network B may not even support CSGs.

In accordance with the teachings herein, to facilitate access control for inter-network roaming, a CSG subscription server 118 is provided at each network to maintain CSG subscription information for visiting access terminals. Thus, when the access terminal 102 requests to establish communication at an access point that is a member of a CSG (e.g., the access point 104), a mobility manager 120 at network A may obtain CSG subscription information for the access terminal 102 from the CSG subscriber server 118 at network A and obtain service context information for the access terminal 102 from a home subscriber server 122 at network B. The mobility manager 120 may then determine whether to allow the access terminal 102 to establish communication at the access point 104 based on whether the CSG subscription information for the access terminal 102 indicates that the access terminal 102 is allowed to access the CSG of the access point 104.

With the above in mind, sample operations and components that may be employed to maintain CSG information in accordance with the teachings herein will be described with reference to FIGS. 2-5. Briefly, FIGS. 2 and 3 relate to maintaining a CSG subscriber server at a network, while FIGS. 4 and 5 relate to maintaining operator and user allowed CSG lists at an access terminal.

Figure 2:
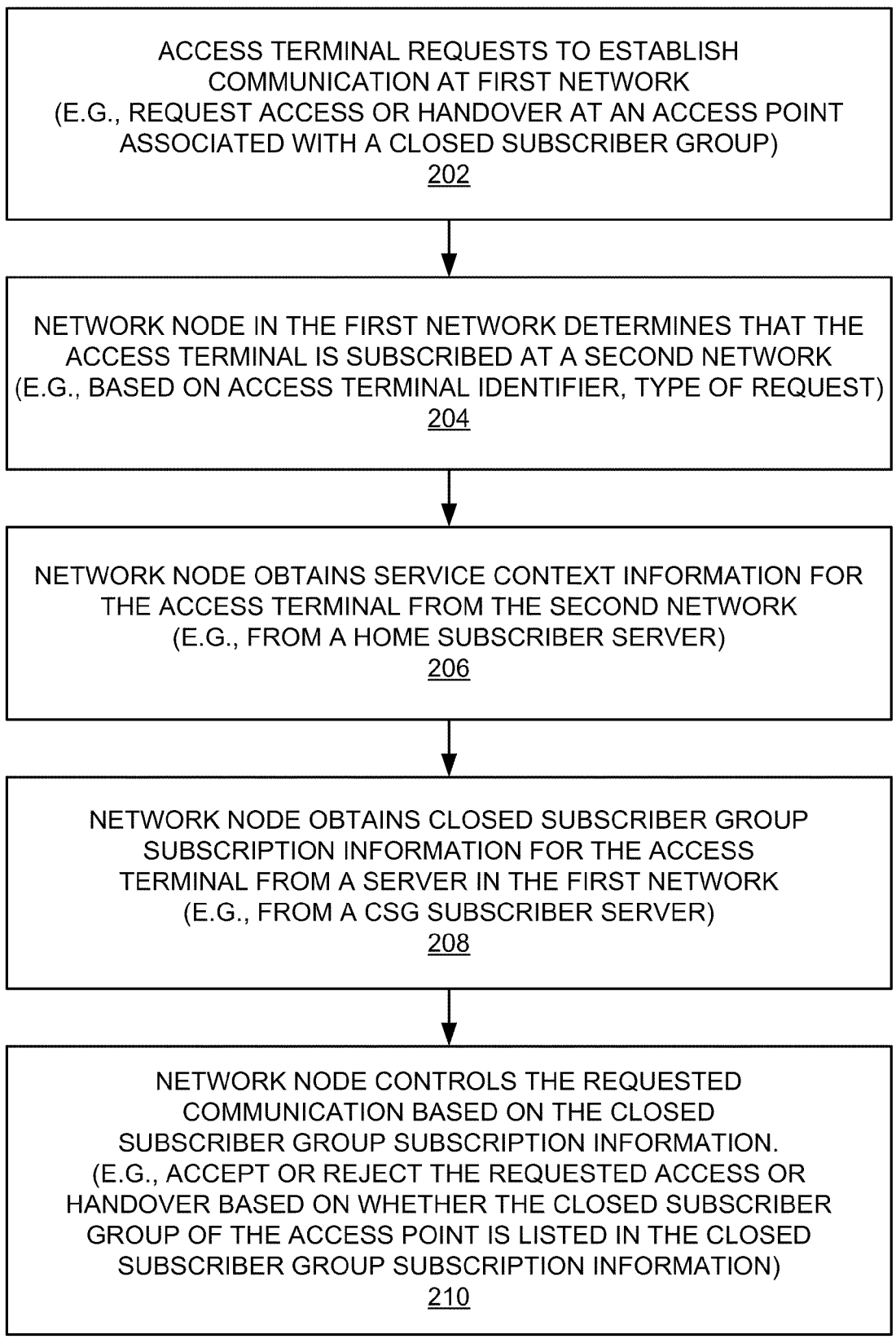
FIG. 2 is a flowchart of several sample aspects of operations that may be performed to maintain and use local CSG subscription information for access control.
Figure 4:
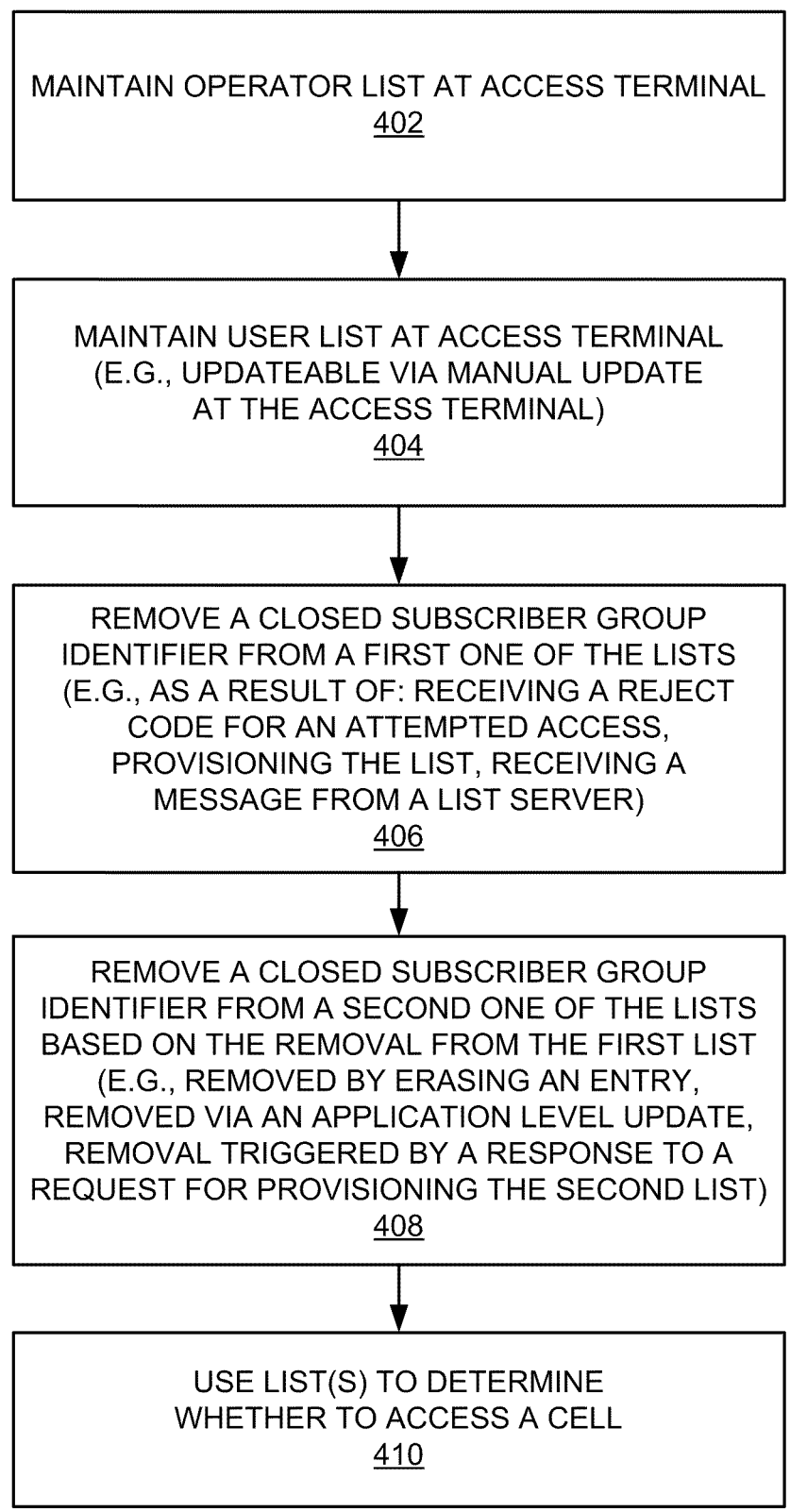
FIG. 4 is a flowchart of several sample aspects of operations that may be performed in conjunction with maintaining operator and user CSG lists at an access terminal.
Figure 5:
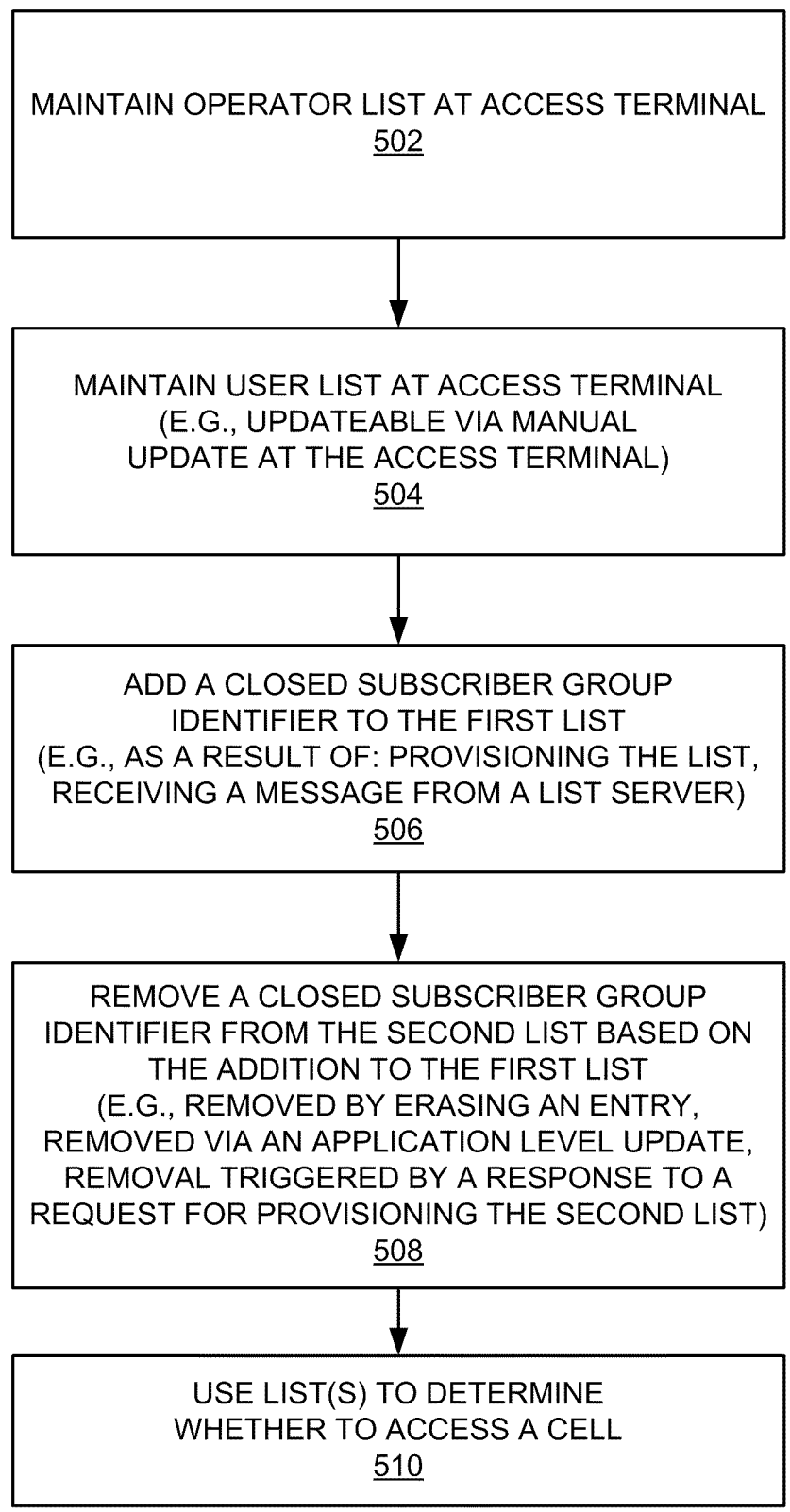
FIG. 5 is a flowchart of several sample aspects of operations that may be performed in conjunction with maintaining operator and user CSG lists at an access terminal.
Figure 6:
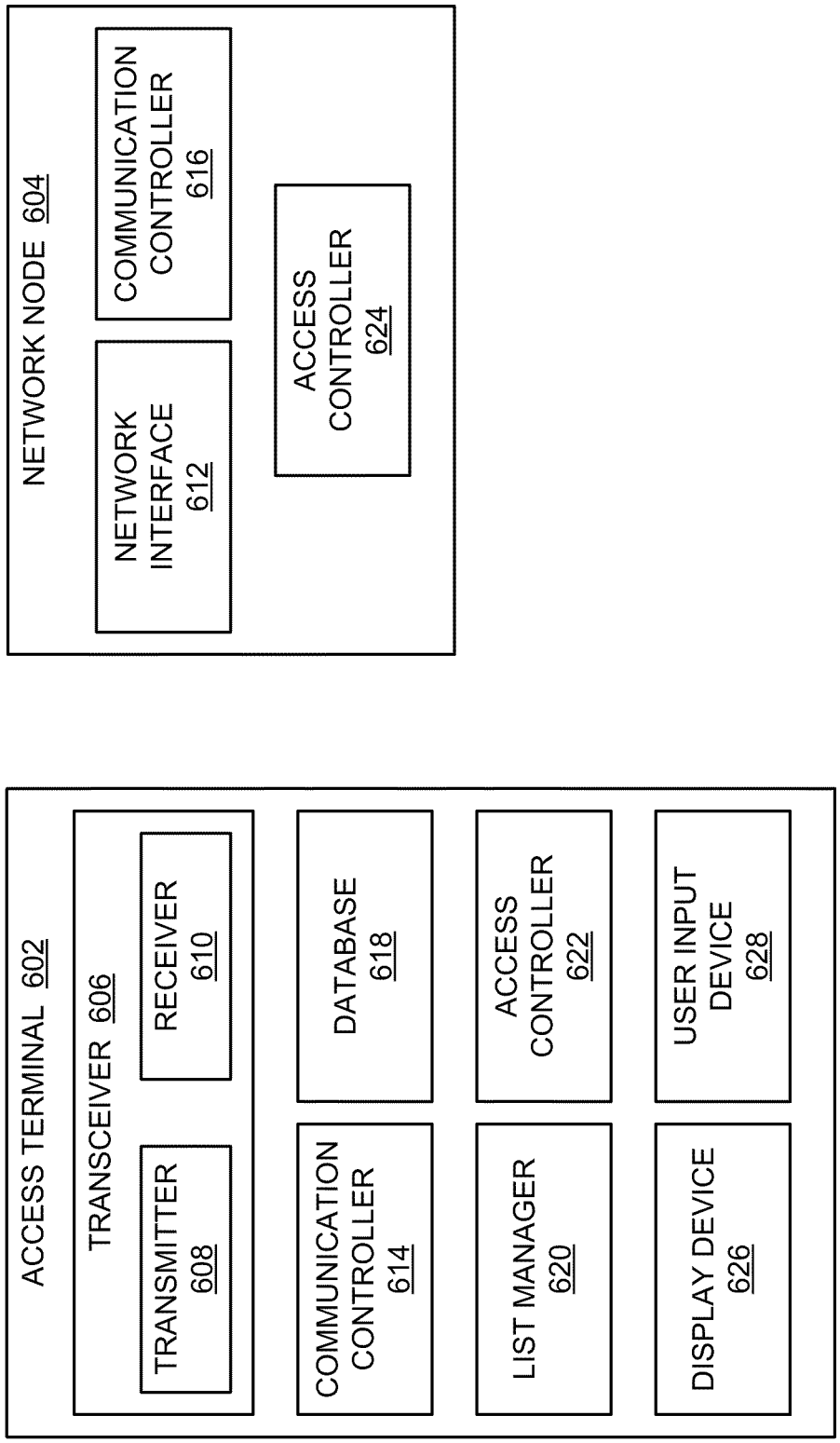
FIG. 6 is a simplified block diagram of several sample aspects of components that may be employed in communication nodes.

For illustration purposes, the operations of FIGS. 2, 4, and 5 (or any other operations discussed or taught herein) may be described as being performed by specific components (e.g., components shown in FIGS. 1 and 6). It should be appreciated, however, that these operations may be performed by other types of components and may be performed using a different number of components. It also should be appreciated that one or more of the operations described herein may not be employed in a given implementation.

Figure 3:
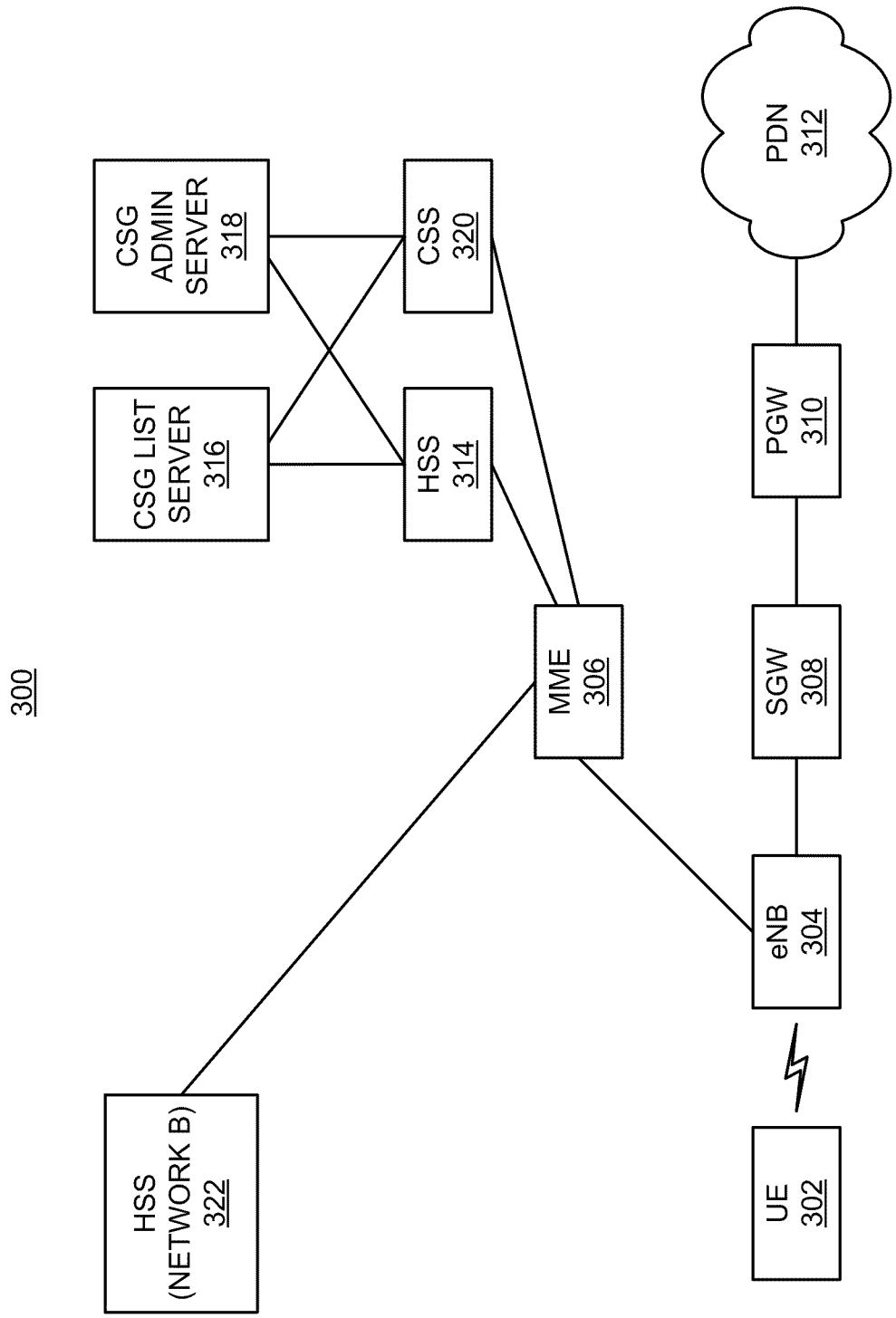
FIG. 3 is a simplified block diagram of several sample aspects of an LTE system adapted to maintain local CSG subscription information.

Referring initially to FIGS. 2 and 3, FIG. 2 describes sample operations that may be performed by a system such as the system 300 depicted in FIG. 3. For purposes of illustration, the examples of FIGS. 2 and 3 describe an implementation that is based on LTE. Thus, FIG. 3 depicts entities such as user equipment (UE) 302, an eNodeB (eNB) 304 (e.g., a home eNB), a mobility management entity (MME) 306, a serving gateway (SGW) 308, a PDN gateway (PGW) 310, a packet data network (PDN) 312, a home subscriber server (HSS) 314, a CSG list server 316, and a CSG admin server 318. It should be appreciated, however, that the concepts taught herein may be applicable to other implementations (e.g., a UMTS-based system, etc.).

As represented by block 202 of FIG. 2, at some point in time an access terminal (e.g., UE 302) requests to establish communication at an access point (e.g., eNB 304). For example, the UE may request to access the eNB or request handover to the eNB.

In this example, the eNB is associated with a CSG. Moreover, the nodes 304-320 are in a first network (network A), while the UE is subscribed at a second network (network B). Thus, from the perspective of the UE, the second network may be a home PLMN while the first network may be a visited PLMN.

Accordingly, as represented by block 204, when the UE requests to establish communication, a network node of the first network (e.g., MME 306) determines that the UE is subscribed at a different network. This determination may be made in various ways. For example, the MME may identify the network at which the UE is subscribed based on an identifier of the UE, based on the type of request sent by the UE to establish communication at the CSG (e.g., an attach message), based on some other suitable information, or based on some combination of this information.

As represented by block 206, upon determining that the UE is subscribed at the second network, the MME may obtain service context information for the UE from the second network. For example, the MME may communicate with an HSS 322 in the second network that maintains context information for the UE. Such service context information may comprise, for example, identification information, authentication information, mobility restrictions, quality of service profiles, charging characteristics, capabilities, and other information. Thus, the MME may use this information to, for example, verify from a trusted source the identity of the UE and that the UE has a valid subscription.

As represented by block 208, the MME obtains CSG subscription information for the UE from a server in the first network. In the example of FIG. 3, this server is referred to as a CSG subscriber server (CSS) 320. The MME may retrieve the CSG subscription information from the CSS during an attach procedure, during a tracking area update procedure, or during some other similar procedure when the access terminal establishes a connection to the first network. In addition, the MME may obtain CSG subscription information updates whenever there is a change in the MME serving the UE, whenever this information changes, or at some other time.

The CSG subscription information for a given CSG will include an identifier of the CSG and an identifier of the network for the CSG (e.g., PLMN). In addition, the CSG subscription information may include, for example, an expiration time, an eNB name (e.g., HeNB name), or other information.

The CSS may be provisioned with the CSG subscription information for the UE in various ways. For example, the CSS may be provisioned by the CSG admin server whenever the owner of a CSG deployed in the first network updates a database (e.g., by accessing a webpage) that specifies the access points that are members of the CSG and/or the access terminals that are allowed to access the CSG.

Here, it should be appreciated that the HSS 314 may still be used to maintain subscription information for home access terminals (e.g., access terminals that are subscribed at the first network). Moreover, in some cases there may be commonality in the functionality of a HSS and a CSS. For example, a HSS and a CSS may both maintain CSG information (e.g., the HSS may maintain CSG information for home access terminals). In addition, the HSS and the CSS may be implemented on a common server.

A CSS need not be limited to maintaining CSG information for visiting access terminals, however. For example, in some implementation the CSS may maintain CSG information for all access terminals in the first network (e.g., including the CSG information for visiting and home access terminals).

As represented by block 210, once it obtains the CSG subscription information for the UE, the MME controls the requested communication based on this information. For example, the MME may determine whether a CSG identifier (CSG ID) of the CSG for the eNB is listed in the CSG subscription information for the UE. If so, the MME may accept the request and allow the UE to establish communication at the eNB (e.g., allows the UE to access the eNB or to be handed-over to the eNB). Otherwise, the MME may reject the request for access.

In some aspects, the MME also may use the information obtained at blocks 206 and/or 208 to provide paging optimization. For example, the MME may use the information regarding which CSGs the UE is allowed to access in the visited network (from the UE's perspective) to determine where to page the UE in that visited network.

Referring now to FIGS. 4, and 5, sample operations that may be performed in conjunction with maintaining operator and user allowed CSG lists will now be described. In particular, FIG. 4 describes a scenario where the removal of a CSG ID from one list results in the removal of that CSG ID from the other list. FIG. 5 describes a scenario where the addition of a CSG ID to one list results in the removal of that CSG from the other list.

As represented by block 402 of FIG. 4, the access terminal (e.g., access terminal 102 of FIG. 1) maintains an operator list for CSG information. In some aspects, the operator list is maintained in such a way that the list is updateable by an operator (e.g., an operator of a wireless network such as a PLMN). For example, the network (e.g., the CSG list server) may invoke an application level update procedure whenever the operator list needs to be updated. Such an update may be accomplished, for example, through the use of open mobile alliance device management (OMA DM) protocol or over-the-air (OTA) protocol.

As represented by block 404, the access terminal also maintains a user list for CSG information. The user list may include entries from a home network (e.g., home PLMN) or from any visited network (e.g., visited PLMN).

In some aspects, the user list is maintained in such a way that the list is updateable by the access terminal (e.g., as a result of a manual update invoked by a user of the access terminal). For example, when the access terminal performs manual cell selection (e.g., the access terminal scans for cells and displays a list of detected cells on a display device to enable the user to select a cell using a user input device), the access terminal (e.g., the CSG list manager 114) may employ a manual update procedure to add the selected cell to the user list. Here, once the access terminal verifies that it is allowed to access that cell, the access terminal will update the user list provided that entry was not already in the user list or the operator list. In some implementations a user may manually update the user list. For example, information about the list (e.g., CSG IDs in the list) may be displayed on a display device and the user may edit the user list information (e.g., add or delete entries) using a user input device. Thus, in some aspects, maintaining the user list to be updateable by the access terminal comprises updating the list based on an indication received from a user input device, or upon receiving an updated version of the list from the CSG list server.

As represented by block 406, at some point in time an entry may be removed from one of the lists (e.g., permissions for an access terminal to access a CSG are removed). The removal of an entry (e.g., a CSG ID) from a list may be triggered in various ways. For example, a CSG ID may be removed from the user list in the event the access terminal is unable to access the CSG (e.g., the access terminal receives a service reject code when attempting to access a cell associated with a CSG). As another example, an entry may be removed from a list via an application level update procedure invoked by the network to provision the list. For example, the access terminal may remove a particular entry from a list upon receipt of a message from a CSG list server that instructs the access terminal to remove that entry.

As represented by block 408, the same entry (e.g., CSG ID) may then be removed from the other list based on the removal of the entry from the list at block 406. For example, in the event the network causes the removal of an entry from the operator list, the access terminal may automatically remove that entry from the user list. In this way, the access terminal may remove an entry from the user list once the network determines that this entry is no longer valid. Accordingly, the access terminal will be prevented from otherwise attempting to access the CSG based on an invalid entry in the user list.

Conversely, in the event the access terminal removes a CSG ID from the user list, the access terminal may automatically take action to remove that CSG ID from the operator list. Here, the access terminal may determine that it is no longer able to access a given CSG (e.g., upon a failed access) before the network provisions the access terminal with this update (e.g., by removing the entry from the list). Hence, the operator list may be updated upon updating of the user list so that the access terminal does not attempt to access that CSG based on the operator list entry.

The removal of an entry from the list at block 408 may be accomplished in various ways. For example, the access terminal may simply erase a CSG ID from the user list in the event the operator list was updated. In addition, an entry may be removed from a list via the access terminal initiating an application level update procedure. For example, upon determining that an entry was removed from the user list at block 406, the access terminal may send a message to the network (e.g., the CSG list server) requesting provisioning of the operator list. As a result of this request, the network (e.g., the CSG list server) may send a provisioning message to the access terminal instructing the access terminal to remove the designated entry from the operator list.

As represented by block 410, the access terminal uses the operator list and/or the user list to determine whether to access a cell (e.g., an access point associated with a CSG). For example, the access terminal may attempt to access a cell of a CSG only if an entry for that CSG appears in at least one of the lists.

The operations of FIG. 4 may thus be used to effectively manage the two lists. For example, if either the network or the access terminal determines than an entry is no longer valid and subsequently causes that entry to be deleted from one of the lists, the access terminal may automatically delete that entry from the other list. In this way, the access terminal may potentially avoid having outdated information in the lists.

Referring now to FIG. 5, as represented by blocks 502 and 504, the access terminal maintains the operator list and the user list. These operations correspond to the operations described above at blocks 402 and 404 of FIG. 4.

As represented by block 506, at some point in time an entry (e.g., a CSG ID) may be added to one of the lists. The addition of an entry to a list may be triggered in various ways. For example, as described above at block 406, an entry may be added to a list via an application level update procedure invoked by the network to provision the list. Thus, the access terminal may add a particular entry to a list upon receipt of a message from a CSG list server that instructs the access terminal to add that entry.

As represented by block 508, in the event the same entry (e.g., CSG ID) was already in the other list, that entry may then be removed from the other list. For example, if the network causes the addition of an entry to the operator list at a time when that entry was already in the user list, the access terminal may automatically remove that entry from the user list.

The addition of an entry to the list at block 508 may be accomplished in various ways. For example, the access terminal may simply add a CSG ID to the user list in the event the operator list was updated. In addition, an entry may be added to a list via an application level update procedure in a similar manner as described at block 408 for the deletion of an entry (e.g., via provisioning by the operator).

As represented by block 510, the access terminal uses the operator list and/or the user list to determine whether to access a cell (e.g., an access point associated with a CSG) as discussed above.

The operations of FIG. 5 may thus be used to effectively manage the two lists. For example, as a result of a manual update, a given entry may initially only appear in the user list. However, at some later point in time the network may provision the operator list with that entry. At that time, the access terminal may automatically delete the entry from the user list.

In this way, the access terminal may potentially avoid having outdated information in the user list.

Various modifications may be made to the above-described operations and components consistent with the teachings herein. For example, in some implementations, a user list may be maintained to be updateable by an operator. In addition, in some implementations, an operator list may be maintained to be updateable by an access terminal.

FIG. 6 illustrates several sample components that may be incorporated into nodes such as an access terminal 602 and a network node 604 (e.g., an MME) to perform access control operations as taught herein. In general, the nodes of FIG. 6 may correspond to the access terminal 102 and the network node(s) 106 or 108 of FIG. 1. The described components also may be incorporated into other nodes in a communication system. For example, other nodes in a system may include components similar to those described for the access terminal 602 and the network node 604 to provide similar functionality. A given node may contain one or more of the described components. For example, an access terminal may contain multiple transceiver components that enable the access terminal to operate on multiple frequencies and/or communicate via different technologies.

As shown in FIG. 6, the access terminal 602 may include a transceiver 606 for communicating with other nodes. The transceiver 606 includes a transmitter 608 for sending signals (e.g., messages or indications) and a receiver 610 for receiving signals.

The network node 604 includes a network interface 612 for communicating with other network nodes. For example, the network interface 612 may be configured to communicate with one or more network nodes via a wired or wireless backhaul.

The access terminal 602 and the network node 604 also include other components that may be used in conjunction with access control operations as taught herein. For example, the access terminal 602 and the network node 604 include communication controllers 614 and 616, respectively, for managing communication with other nodes (e.g., one or more of obtaining service context information, obtaining CSG information, sending and receiving messages, requests, indications, authorization information, or responses) and for providing other related functionality as taught herein. In addition, the access terminal 602 includes a database 618 for maintaining operator and user lists and for providing other related functionality as taught herein. For example, the database 618 may be implemented as a data memory, as a database server, or as some other suitable structure for storing list information. The access terminal 602 includes a list manager 620 for managing the lists (e.g., for adding information to and removing information from these lists) and for providing other related functionality as taught herein. In some aspects, the database 618 and the list manager 620 correspond to the components 110, 114, and 116 described in FIG. 1. The access terminal 602 also includes an access controller 622 for managing access (e.g., using the lists to determining whether to access a cell) and for providing other related functionality as taught herein. In addition, the access terminal 602 includes a display device 626 and a user input device 628 as discussed herein. Finally, the network node 604 includes an access controller 624 for managing access (e.g., determining where an access terminal is subscribed and controlling requested access) and for providing other related functionality as taught herein.

For convenience the nodes are shown in FIG. 6 as including components that may be used in the various examples described herein. In practice, one or more of the illustrated components may be implemented in different ways in different implementations. As an example, the access the access terminal 602 may have different functionality and/or operate in a different manner in the scenario of FIG. 4 as compared to the scenario of FIG. 5.

In some implementations the components of FIG. 6 may be implemented in one or more processors (e.g., that uses and/or incorporates data memory). For example, the functionality of blocks 614, 618, 620, and 622 may be implemented at least in part by a processor or processors of an access terminal, and the functionality of blocks 616 and 624 may be implemented by a processor or processors in a network node.

In some aspects the teachings herein may be employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macro access point while a node that provides coverage over a relatively small area (e.g., a residence) may be referred to as a femto access point. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macro access point, a femto access point, or other access point-type nodes. For example, a macro access point may be configured or referred to as an access node, base station, access point, eNodeB, macro cell, and so on. Also, a femto access point may be configured or referred to as a Home NodeB, Home eNodeB, access point base station, femto cell, and so on. In some implementations, a node may be associated with (e.g., divided into) one or more cells or sectors. A cell or sector associated with a macro access point, a femto access point, or a pico access point may be referred to as a macro cell, a femto cell, or a pico cell, respectively.

Figure 7:
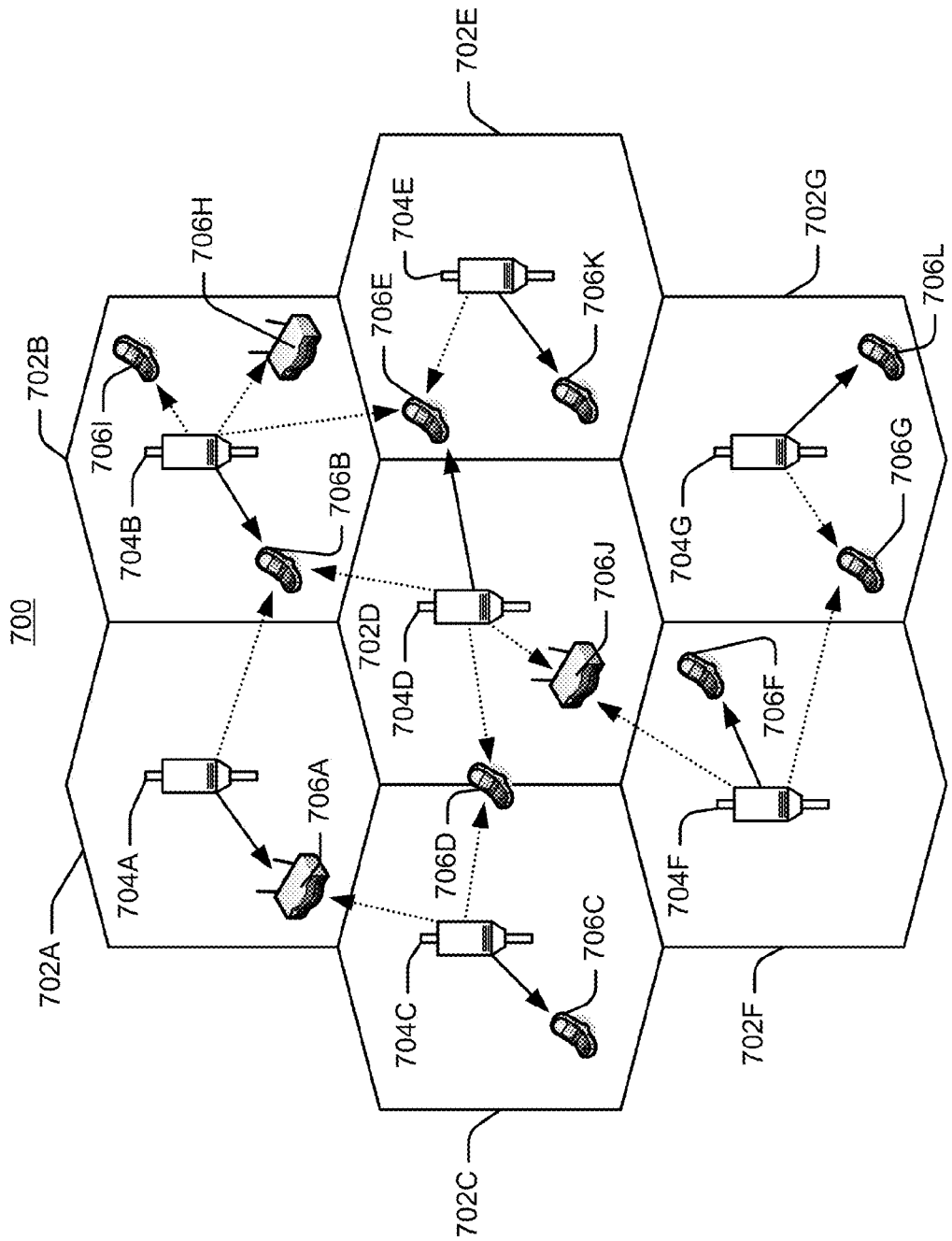
FIG. 7 is a simplified diagram of a wireless communication system.

FIG. 7 illustrates a wireless communication system 700, configured to support a number of users, in which the teachings herein may be implemented. The system 700 provides communication for multiple cells 702, such as, for example, macro cells 702A-702G, with each cell being serviced by a corresponding access point 704 (e.g., access points 704A-704G). As shown in FIG. 7, access terminals 706 (e.g., access terminals 706A-706L) may be dispersed at various locations throughout the system over time. Each access terminal 706 may communicate with one or more access points 704 on a forward link (FL) and/or a reverse link (RL) at a given moment, depending upon whether the access terminal 706 is active and whether it is in soft handoff, for example. The wireless communication system 700 may provide service over a large geographic region. For example, macro cells 702A-702G may cover a few blocks in a neighborhood or several miles in rural environment.

Figure 8:
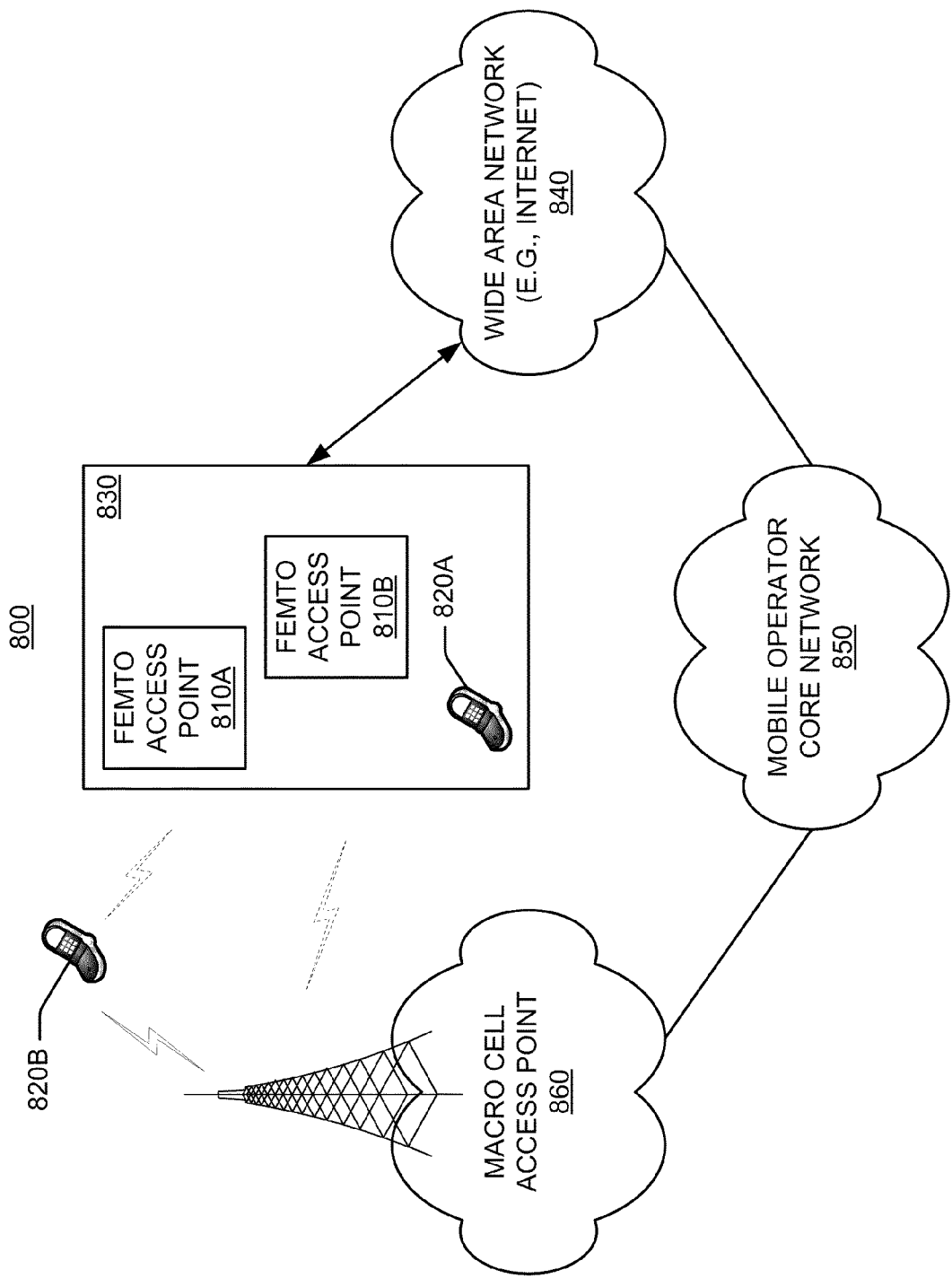
FIG. 8 is a simplified diagram of a wireless communication system including femto nodes.

FIG. 8 illustrates an exemplary communication system 800 where one or more femto access points are deployed within a network environment. Specifically, the system 800 includes multiple femto access points 810 (e.g., femto access points 810A and 810B) installed in a relatively small scale network environment (e.g., in one or more user residences 830). Each femto access point 810 may be coupled to a wide area network 840 (e.g., the Internet) and a mobile operator core network 850 via a DSL router, a cable modem, a wireless link, or other connectivity means (not shown). As will be discussed below, each femto access point 810 may be configured to serve associated access terminals 820 (e.g., access terminal 820A) and, optionally, other (e.g., hybrid or alien) access terminals 820 (e.g., access terminal 820B). In other words, access to femto access points 810 may be restricted whereby a given access terminal 820 may be served by a set of designated (e.g., home) femto access point(s) 810 but may not be served by any non-designated femto access points 810 (e.g., a neighbor's femto access point 810).

Figure 9:
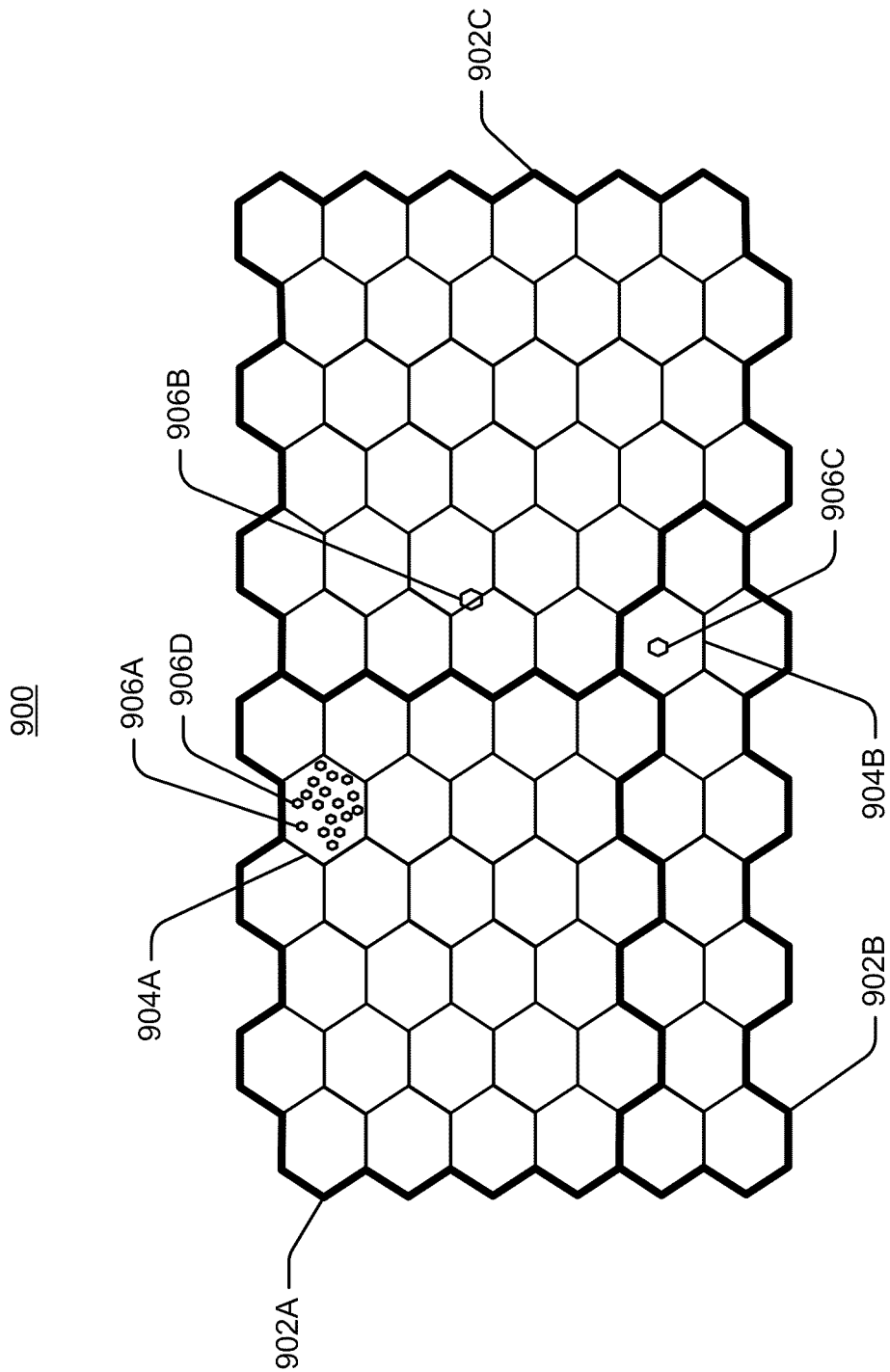
FIG. 9 is a simplified diagram illustrating coverage areas for wireless communication.

FIG. 9 illustrates an example of a coverage map 900 where several tracking areas 902 (or routing areas or location areas) are defined, each of which includes several macro coverage areas 904. Here, areas of coverage associated with tracking areas 902A, 902B, and 902C are delineated by the wide lines and the macro coverage areas 904 are represented by the larger hexagons. The tracking areas 902 also include femto coverage areas 906. In this example, each of the femto coverage areas 906 (e.g., femto coverage area 906C) is depicted within one or more macro coverage areas 904 (e.g., macro coverage area 904B). It should be appreciated, however, that some or all of a femto coverage area 906 may not lie within a macro coverage area 904. In practice, a large number of femto coverage areas 906 may be defined with a given tracking area 902 or macro coverage area 904. Also, one or more pico coverage areas (not shown) may be defined within a given tracking area 902 or macro coverage area 904.

Referring again to FIG. 8, the owner of a femto access point 810 may subscribe to mobile service, such as, for example, 3G mobile service, offered through the mobile operator core network 850. In addition, an access terminal 820 may be capable of operating both in macro environments and in smaller scale (e.g., residential) network environments. In other words, depending on the current location of the access terminal 820, the access terminal 820 may be served by a macro cell access point 860 associated with the mobile operator core network 850 or by any one of a set of femto access points 810 (e.g., the femto access points 810A and 810B that reside within a corresponding user residence 830). For example, when a subscriber is outside his home, he is served by a standard macro access point (e.g., access point 860) and when the subscriber is at home, he is served by a femto access point (e.g., access point 810A). Here, a femto access point 810 may be backward compatible with legacy access terminals 820.

A femto access point 810 may be deployed on a single frequency or, in the alternative, on multiple frequencies. Depending on the particular configuration, the single frequency or one or more of the multiple frequencies may overlap with one or more frequencies used by a macro access point (e.g., access point 860).

In some aspects, an access terminal 820 may be configured to connect to a preferred femto access point (e.g., the home femto access point of the access terminal 820) whenever such connectivity is possible. For example, whenever the access terminal 820A is within the user's residence 830, it may be desired that the access terminal 820A communicate only with the home femto access point 810A or 810B.

In some aspects, if the access terminal 820 operates within the macro cellular network 850 but is not residing on its most preferred network (e.g., as defined in a preferred roaming list), the access terminal 820 may continue to search for the most preferred network (e.g., the preferred femto access point 810) using a better system reselection (BSR) procedure, which may involve a periodic scanning of available systems to determine whether better systems are currently available and subsequently acquire such preferred systems. The access terminal 820 may limit the search for specific band and channel. For example, one or more femto channels may be defined whereby all femto access points (or all restricted femto access points) in a region operate on the femto channel(s). The search for the most preferred system may be repeated periodically. Upon discovery of a preferred femto access point 810, the access terminal 820 selects the femto access point 810 and registers on it for use when within its coverage area.

Access to a femto access point may be restricted in some aspects. For example, a given femto access point may only provide certain services to certain access terminals. In deployments with so-called restricted (or closed) access, a given access terminal may only be served by the macro cell mobile network and a defined set of femto access points (e.g., the femto access points 810 that reside within the corresponding user residence 830). In some implementations, a node may be restricted to not provide, for at least one node, at least one of: signaling, data access, registration, paging, or service.

In some aspects, a restricted femto access point (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., femto access points) that share a common access control list of access terminals.

Various relationships may thus exist between a given femto access point and a given access terminal. For example, from the perspective of an access terminal, an open femto access point may refer to a femto access point with unrestricted access (e.g., the femto access point allows access to any access terminal). A restricted femto access point may refer to a femto access point that is restricted in some manner (e.g., restricted for access and/or registration). A home femto access point may refer to a femto access point on which the access terminal is authorized to access and operate on (e.g., permanent access is provided for a defined set of one or more access terminals). A guest (or hybrid) femto access point may refer to a femto access point on which an access terminal is temporarily authorized to access or operate on. An alien femto access point may refer to a femto access point on which the access terminal is not authorized to access or operate on, except for perhaps emergency situations (e.g., 911 calls).

From a restricted femto access point perspective, a home access terminal may refer to an access terminal that is authorized to access the restricted femto access point installed in the residence of that access terminal's owner (usually the home access terminal has permanent access to that femto access point). A guest access terminal may refer to an access terminal with temporary access to the restricted femto access point (e.g., limited based on deadline, time of use, bytes, connection count, or some other criterion or criteria). An alien access terminal may refer to an access terminal that does not have permission to access the restricted femto access point, except for perhaps emergency situations, for example, such as 911 calls (e.g., an access terminal that does not have the credentials or permission to register with the restricted femto access point).

For convenience, the disclosure herein describes various functionality in the context of a femto access point. It should be appreciated, however, that a pico access point may provide the same or similar functionality for a larger coverage area. For example, a pico access point may be restricted, a home pico access point may be defined for a given access terminal, and so on.

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S$<min$\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
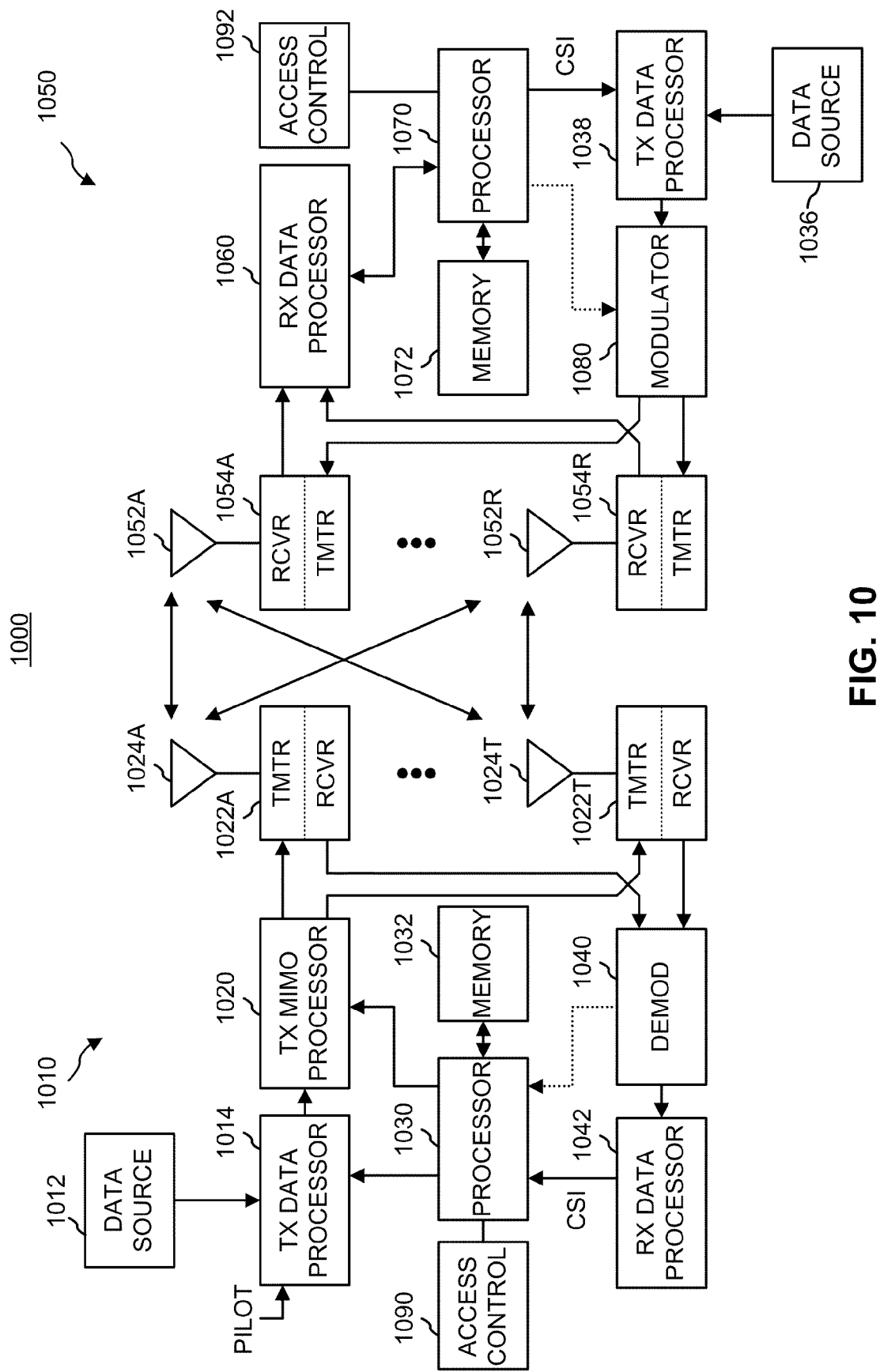
FIG. 10 is a simplified block diagram of several sample aspects of communication components.

FIG. 10 illustrates a wireless device 1010 (e.g., an access point) and a wireless device 1050 (e.g., an access terminal) of a sample MIMO system 1000. At the device 1010, traffic data for a number of data streams is provided from a data source 1012 to a transmit (TX) data processor 1014. Each data stream may then be transmitted over a respective transmit antenna.

The TX data processor 1014 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers (XCVR) 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the device 1050, the transmitted modulated signals are received by $N_R$ antennas 1052A through 1052R and the received signal from each antenna 1052 is provided to a respective transceiver (XCVR) 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive (RX) data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which pre-coding matrix to use (discussed below). The processor 1070 formulates a reverse link message comprising a matrix index portion and a rank value portion. A data memory 1072 may store program code, data, and other information used by the processor 1070 or other components of the device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the device 1050 are received by the antennas 1024, conditioned by the transceivers 1022, demodulated by a demodulator (DEMOD) 1040, and processed by a RX data processor 1042 to extract the reverse link message transmitted by the device 1050. The processor 1030 then determines which pre-coding matrix to use for determining the beam-forming weights then processes the extracted message.

FIG. 10 also illustrates that the communication components may include one or more components that perform access control operations as taught herein. For example, an access control component 1090 may cooperate with the processor 1030 and/or other components of the device 1010 to provide access to another device (e.g., device 1050) as taught herein. Similarly, an access control component 1092 may cooperate with the processor 1070 and/or other components of the device 1050 to gain access to another device (e.g., device 1010). It should be appreciated that for each device 1010 and 1050 the functionality of two or more of the described components may be provided by a single component. For example, a single processing component may provide the functionality of the access control component 1090 and the processor 1030 and a single processing component may provide the functionality of the access control component 1092 and the processor 1070.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199, Re15, Re16, Re17) technology, as well as 3GPP2 (e.g., 1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 11:
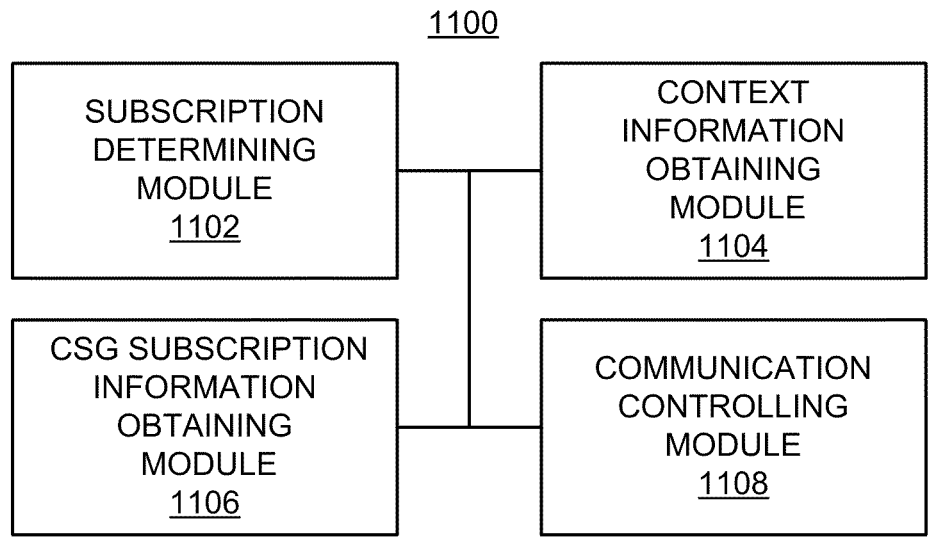
FIGS. 11-13 are simplified block diagrams of several sample aspects of apparatuses configured to maintain CSG information for access control as taught herein.
Figure 12:
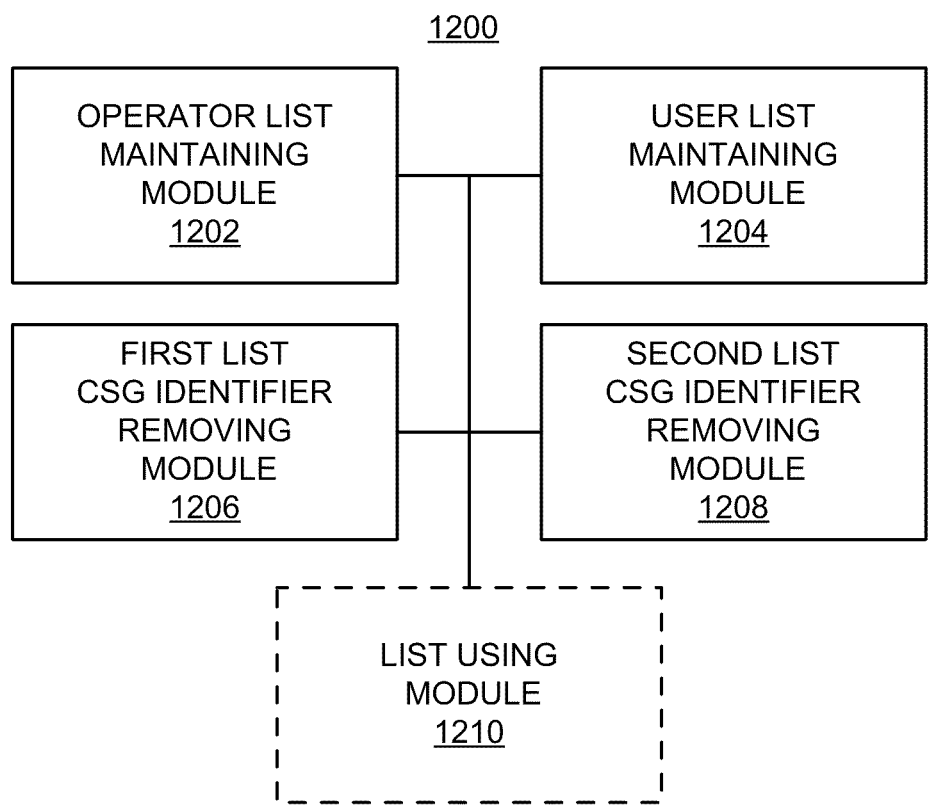
Figure 13:
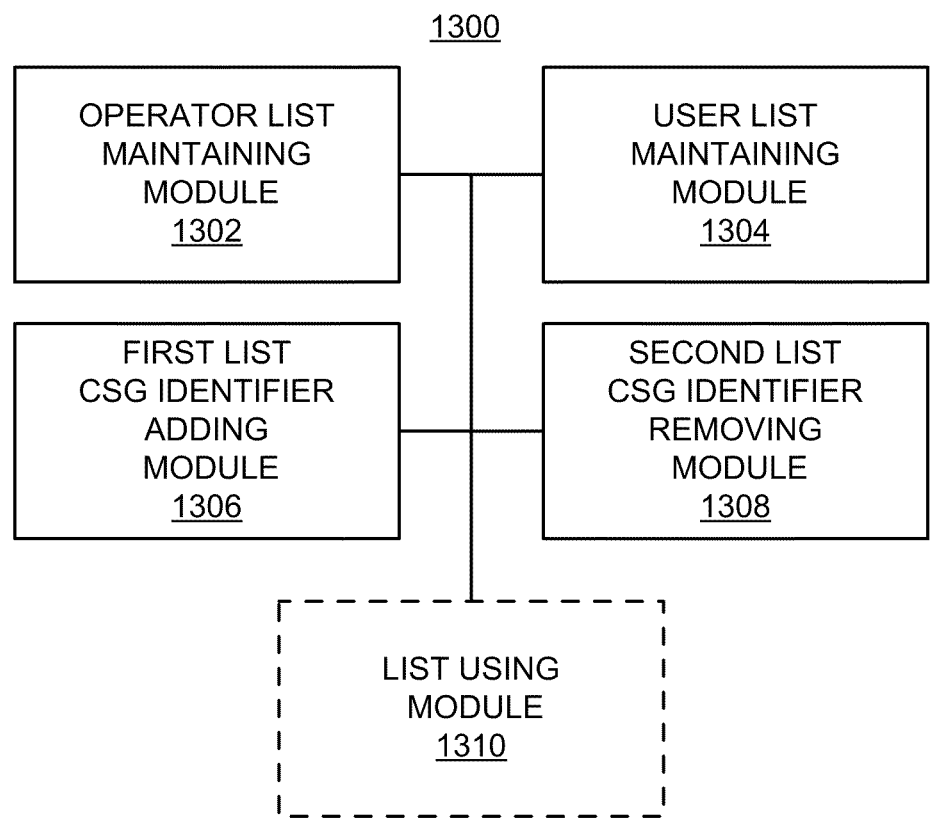

The functionality described herein (e.g., with regard to one or more of the accompanying figures) may correspond in some aspects to similarly designated "means for" functionality in the appended claims. Referring to FIGS. 11-13, apparatuses 1100, 1200, and 1300 are represented as a series of interrelated functional modules. Here, a subscription determining module 1102 may correspond at least in some aspects to, for example, an access controller as discussed herein. A context information obtaining module 1104 may correspond at least in some aspects to, for example, a communication controller as discussed herein. A CSG subscription information obtaining module 1106 may correspond at least in some aspects to, for example, a communication controller as discussed herein. A communication controlling module 1108 may correspond at least in some aspects to, for example, an access controller as discussed herein. An operator list maintaining module 1202 may correspond at least in some aspects to, for example, a database as discussed herein. A user list maintaining module 1204 may correspond at least in some aspects to, for example, a database as discussed herein. A first list CSG identifier removing module 1206 may correspond at least in some aspects to, for example, a list manager as discussed herein. A second list CSG identifier removing module 1208 may correspond at least in some aspects to, for example, a list manager as discussed herein. A list using module 1210 may correspond at least in some aspects to, for example, an access controller as discussed herein. An operator list maintaining module 1302 may correspond at least in some aspects to, for example, a database as discussed herein. A user list maintaining module 1304 may correspond at least in some aspects to, for example, a database as discussed herein. A first list CSG identifier adding module 1306 may correspond at least in some aspects to, for example, a list manager as discussed herein. A second list CSG identifier removing module 1308 may correspond at least in some aspects to, for example, a list manager as discussed herein. A list using module 1310 may correspond at least in some aspects to, for example, an access controller as discussed herein.

The functionality of the modules of FIGS. 11-13 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 11-13 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   determining, by a network node of a first network, that an access terminal requesting to establish communication at the first network is subscribed at a second network;
   obtaining, by the network node of the first network, service context information for the access terminal from the second network;
   obtaining closed subscriber group subscription information for the access terminal from a server in the first network, wherein the server comprises a closed subscriber group subscriber server that at least stores closed subscriber group subscription information for visiting access terminals at the first network, and the closed subscriber group subscription information identifies at least one closed subscriber group that the access terminal is allowed to access; and
   controlling the requested communication based on the closed subscriber group subscription information,
   wherein the requesting to establish communication comprises the access terminal requesting to access a femto access point associated with a closed subscriber group; and
   wherein the controlling of the requested communication comprises:
   determining whether the closed subscriber group of the femto access point is listed in the closed subscriber group subscription information for the access terminal; and
   determining whether to reject or accept the requested access based on the determination of whether the closed subscriber group of the femto access point is listed in the closed subscriber group subscription information.

2. The method of claim 1, wherein the service context information is obtained from a home subscriber server of the second network.

3. The method of claim 1, wherein:
   the first network comprises a visited public land mobile network for the access terminal; and
   the second network comprises a home public land mobile network for the access terminal.

4. The method of claim 1, wherein the request to establish communication comprises the access terminal requesting handover to a femto access point associated with a closed subscriber group.

5. The method of claim 4, wherein the controlling of the requested communication comprises:
   determining whether the closed subscriber group of the femto access point is listed in the closed subscriber group subscription information for the access terminal; and
   determining whether to reject or accept the requested handover based on the determination of whether the closed subscriber group of the femto access point is listed in the closed subscriber group subscription information.

6. The method of claim 1, wherein the determination that the access terminal is subscribed at the second network is based on at least one of the group consisting of: an identifier of the access terminal and a type of request sent by the access terminal to request the establishment of communication at the first network.

7. The method of claim 1, wherein the network node of the first network comprises a mobility management entity for obtaining the service context information and the closed subscriber group subscription information.

8. The method of claim 1, wherein obtaining closed subscriber group subscription information is performed during an attach procedure to the first network by the access terminal.

9. The method of claim 1, wherein the obtained closed subscriber group subscription information comprises an expiration time of an associated subscription of the access terminal.

10. The method of claim 1, further comprising obtaining updates of the closed subscriber group subscription information for the access terminal from the server in the first network upon detecting a change in the network node of the first network.

11. An apparatus for communication, comprising:
    an access controller of a network node of a first network configured to determine that an access terminal requesting to establish communication at the first network is subscribed at a second network, wherein the requesting to establish communication comprises the access terminal requesting to access a femto access point associated with a closed subscriber group; and
    a communication controller of the network node of the first network configured to obtain service context information for the access terminal from the second network, and obtain closed subscriber group subscription information for the access terminal from a server in the first network,
    wherein:
    the server comprises a closed subscriber group subscriber server that at least stores closed subscriber group subscription information for visiting access terminals at the first network,
    the closed subscriber group subscription information identifies at least one closed subscriber group that the access terminal is allowed to access, and
    the access controller is further configured to control the requested communication based on the closed subscriber group subscription information wherein said control comprises:
    determining whether the closed subscriber group of the femto access point is listed in the closed subscriber group subscription information for the access terminal; and
    determining whether to reject or accept the requested access based on the determination of whether the closed subscriber group of the femto access point is listed in the closed subscriber group subscription information.

12. The apparatus of claim 11, wherein the service context information is obtained from a home subscriber server of the second network.

13. The apparatus of claim 11, wherein:
    the first network comprises a visited public land mobile network for the access terminal; and
    the second network comprises a home public land mobile network for the access terminal.

14. An apparatus for communication, comprising:
    means for determining, by a network node of a first network, that an access terminal requesting to establish communication at the first network is subscribed at a second network, wherein the requesting to establish communication comprises the access terminal requesting to access a femto access point associated with a closed subscriber group;

means for obtaining, by the network node of the first network, service context information for the access terminal from the second network;

means for obtaining closed subscriber group subscription information for the access terminal from a server in the first network, wherein the server comprises a closed subscriber group subscriber server that at least stores closed subscriber group subscription information for visiting access terminals at the first network, and the closed subscriber group subscription information identifies at least one closed subscriber group that the access terminal is allowed to access; and means for controlling the requested communication based on the closed subscriber group subscription information wherein said controlling comprises:

determining whether the closed subscriber group of the femto access point is listed in the closed subscriber group subscription information for the access terminal; and determining whether to reject or accept the requested access based on the determination of whether the closed subscriber group of the femto access point is listed in the closed subscriber group subscription information.

15. The apparatus of claim 14, wherein the service context information is obtained from a home subscriber server of the second network.

16. The apparatus of claim 14, wherein:
the first network comprises a visited public land mobile network for the access terminal; and
the second network comprises a home public land mobile network for the access terminal.

17. A computer-program product, comprising:
a non-transitory computer-readable medium comprising code for causing a computer of a network node of a first network to:
determine that an access terminal requesting to establish communication at the first network is subscribed at a second network, wherein the requesting to establish communication comprises the access terminal requesting to access a femto access point associated with a closed subscriber group;

obtain service context information for the access terminal from the second network;

obtain closed subscriber group subscription information for the access terminal from a server in the first network, wherein the server comprises a closed subscriber group subscriber server that at least stores closed subscriber group subscription information for visiting access terminals at the first network, and the closed subscriber group subscription information identifies at least one closed subscriber group that the access terminal is allowed to access; and control the requested communication based on the closed subscriber group subscription information, wherein said control comprises:

determining whether the closed subscriber group of the femto access point is listed in the closed subscriber group subscription information for the access terminal; and determining whether to reject or accept the requested access based on the determination of whether the closed subscriber group of the femto access point is listed in the closed subscriber group subscription information.

18. The computer-program product of claim 17, wherein the service context information is obtained from a home subscriber server of the second network.

19. The computer-program product of claim 17, wherein:
the first network comprises a visited public land mobile network for the access terminal; and
the second network comprises a home public land mobile network for the access terminal.

* * * * *